(12) United States Patent
Deng et al.

(10) Patent No.: US 11,753,265 B2
(45) Date of Patent: Sep. 12, 2023

(54) STAMPING STRIP REEL REPLACING SYSTEM

(71) Applicants: Tyco Electronics (Shanghai) Co. Ltd., Shanghai (CN); TE Connectivity Services GmbH, Schaffhausen (CH); TE Connectivity Germany GmbH, Bensheim (DE)

(72) Inventors: Yingcong Deng, Shanghai (CN); Dandan Zhang, Shanghai (CN); Lvhai Hu, Shanghai (CN); Fengchun Xie, Shanghai (CN); Roberto Francisco-Yi Lu, Bellevue, WA (US); Josef Sinder, Woert (DE); Zongjie Tao, Shanghai (CN); Xiaochen Yu, Shanghai (CN); Swapnilsinh Solanki, Middletown, PA (US); Jiankun Zhou, Middletown, PA (US); Tim Darr, Middletown, PA (US)

(73) Assignees: TE Connectivity Germany GmbH, Bensheim (DE); Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 295 days.

(21) Appl. No.: 17/320,403

(22) Filed: May 14, 2021

(65) Prior Publication Data
US 2021/0354945 A1 Nov. 18, 2021

(30) Foreign Application Priority Data
May 14, 2020 (CN) .......................... 202010407385.9

(51) Int. Cl.
*B65H 18/10* (2006.01)
*B65H 19/30* (2006.01)
(Continued)

(52) U.S. Cl.
CPC ........... *B65H 19/305* (2013.01); *B65H 18/10* (2013.01); *B65H 19/26* (2013.01); *B21D 22/02* (2013.01); *B21D 43/006* (2013.01)

(58) Field of Classification Search
CPC ...... B65H 18/10; B65H 19/26; B65H 19/305; B65H 2405/461; B21D 22/02; B21D 43/006; B21C 47/24
See application file for complete search history.

(56) References Cited

U.S. PATENT DOCUMENTS 3,461,703 A * 8/1969 Ranney ............... B21C 47/3433
242/562
5,895,009 A * 4/1999 Sato ........................ B21C 47/24
156/158

(Continued)

*Primary Examiner* — Sang K Kim
(74) *Attorney, Agent, or Firm* — Barley Snyder

(57) ABSTRACT

A stamping strip reel replacing system includes an autonomous mobile robot and an automatic guide vehicle. The autonomous mobile robot is adapted to autonomously move to a position where a reel driving shaft for mounting the reel is located, and includes a grabbing tool for grabbing the reel. The automatic guide vehicle moves together with the autonomous mobile robot, and carries an empty reel wound with no stamping strip. The autonomous mobile robot is further adapted to unload a full reel wound with the stamping strip from the reel driving shaft and place the unloaded full reel onto the automatic guide vehicle by operating the grabbing tool. The autonomous mobile robot is further adapted to grab the empty reel from the automatic guide vehicle and mount the grabbed empty reel onto the reel driving shaft by operating the grabbing tool.

20 Claims, 1 Drawing Sheet

(51) Int. Cl.
*B65H 19/26* (2006.01)
*B21D 43/00* (2006.01)
*B21D 22/02* (2006.01)

(56) References Cited

U.S. PATENT DOCUMENTS

| | | | | |
|---|---|---|---|---|
| 6,371,399 B1* | 4/2002 | Marchante | ......... | B65H 19/2215 |
| | | | | 242/525 |
| 8,430,351 B2* | 4/2013 | Smith | .................... | B65H 19/26 |
| | | | | 242/527 |
| 2020/0353523 A1* | 11/2020 | Yogo | ...................... | B21D 7/025 |

* cited by examiner

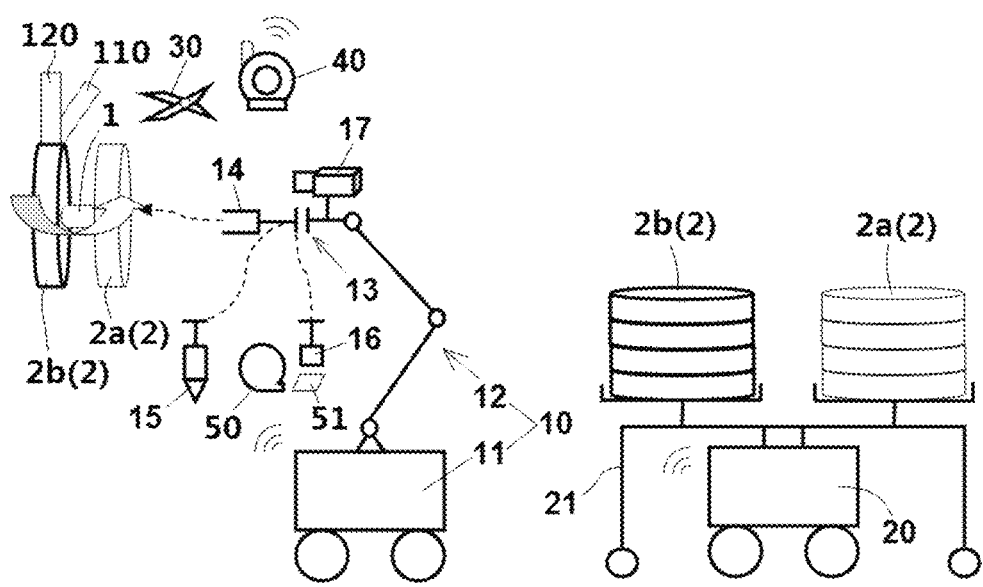

US 11,753,265 B2

STAMPING STRIP REEL REPLACING SYSTEM

CROSS-REFERENCE TO RELATED APPLICATIONS

This application claims priority under 35 U.S.C. § 119 to Chinese Patent Application No. 202010407385.9 filed on May 14, 2020.

FIELD OF THE INVENTION

The present disclosure relates to reel replacement systems, and more particularly, to a stamping strip reel replacing system.

BACKGROUND

In order to replace a reel which has been wound with a stamping strip, a stamping machine needs to be stopped. Once stopped, the reel wound with the stamping strip is unloaded, and an empty reel wound with no stamping strip is loaded to continue receiving and winding the stamping strip output from the stamping machine. In the prior art, this reel replacement operation is performed manually, which has a low efficiency, and adversely affects the utilization rate of the stamping machine.

SUMMARY

According to an embodiment of the present disclosure, a stamping strip reel replacing system includes an autonomous mobile robot and an automatic guide vehicle. The autonomous mobile robot autonomously moves to a position where a reel driving shaft for mounting the reel is located, and includes a grabbing tool for grabbing the reel. The automatic guide vehicle moves together with the autonomous mobile robot, and carries an empty reel wound with no stamping strip. The autonomous mobile robot unloads a full reel wound with the stamping strip from the reel driving shaft and places the unloaded full reel onto the automatic guide vehicle with the grabbing tool. The autonomous mobile robot is further adapted to grab the empty reel from the automatic guide vehicle and mount the grabbed empty reel onto the reel driving shaft by operating the grabbing tool.

BRIEF DESCRIPTION OF THE DRAWINGS

The invention will now be described by way of example with reference to the accompanying Figure, of which:

FIG. 1 is a schematic diagram showing a stamping strip reel replacing system according to an exemplary embodiment of the present disclosure.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the present disclosure, there is provided a stamping strip reel replacing system adapted to replace a reel for winding a stamping strip, the stamping strip reel replacing system includes: an autonomous mobile robot which is capable of autonomously moving to a position where a reel driving shaft for mounting the reel is located, and includes a grabbing tool adapted to grab the reel; and an automatic guide vehicle configured to move together with the autonomous mobile robot, and to carry an empty reel wound with no stamping strip, the autonomous mobile robot is adapted to unload a full reel wound with the stamping strip from the reel driving shaft and place the unloaded full reel onto the automatic guide vehicle by operating the grabbing tool; and the autonomous mobile robot is further adapted to grab the empty reel from the automatic guide vehicle and mount the grabbed empty reel onto the reel driving shaft by operating the grabbing tool.

FIG. 1 is a schematic diagram showing a stamping strip reel replacing system according to an exemplary embodiment of the present disclosure. As shown in FIG. 1, in the illustrated embodiment, the stamping strip reel replacing system is adapted to replace the reel 2 used for winding the stamping strip 110. A stamping machine (not shown) forms terminals in the stamping strip 110 by stamping.

As shown in FIG. 1, in the illustrated embodiment, the stamping strip reel replacing system includes an autonomous mobile robot 10 and an automatic guide vehicle (AGV) 20. The autonomous mobile robot 10 is capable of autonomously moving to a position where the reel driving shaft 1 for mounting the reel 2 is located and includes a grabbing tool 14 adapted to grab the reel 2. The automatic guide vehicle 20 is configured to move together with the autonomous mobile robot 10, and to carry an empty reel 2a wound with no stamping strip 110. The automatic guide vehicle 20 is used to provide the autonomous mobile robot 10 with the empty reel 2a.

As shown in FIG. 1, in the illustrated embodiment the autonomous mobile robot 10 is adapted to unload the full reel 2b wound with the stamping strip 110 from the reel driving shaft 1, and place the unloaded full reel 2b onto the automatic guide vehicle 20 by operating the grabbing tool 14. The autonomous mobile robot 10 is further adapted to grab the empty reel 2a from the automatic guide vehicle 20, and mount the grabbed empty reel 2a onto the reel driving shaft 1 by operating the grabbing tool 14. In this way, the reel 2 can be replaced.

As shown in FIG. 1, in the illustrated embodiment, the stamping strip reel replacing system further includes a wireless communication module 40 adapted to wirelessly communicate with the autonomous mobile robot 10 and the automatic guide vehicle 20. The wireless communication module 40 notifies the autonomous mobile robot 10 and the automatic guide vehicle 20 to move to a position to replace the reel 2 on the reel driving shaft 1 when the reel 2 on the reel driving shaft 1 is nearly fully wound, but not yet fully wound so as to minimize downtime.

As shown in FIG. 1, in the illustrated embodiment, the stamping strip reel replacing system further includes a shearing mechanism 30. The shearing mechanism 30 is adapted to cut off the stamping strip 110 when the reel 2 on the reel driving shaft 1 is fully wound.

As shown in FIG. 1, in the illustrated embodiment, the autonomous mobile robot 10 further includes a glue applying tool 15, which is adapted to apply a glue to a paper strip 120 wound around the stamping strip 110 after the shearing mechanism 30 cuts off the stamping strip 110. In this way, the paper strip 120 wound around the stamping strip 110 is bonded together to constrain and fix the stamping strip 110 wound around the full reel 2b to be replaced.

As shown in FIG. 1, in the illustrated embodiment, the shearing mechanism 30 is further adapted to cut off the paper strip 120 when the glue has been applied to the paper strip 120 wound around the stamping strip 110 and the paper strip 120 wound around the stamping strip 110 has been bonded together.

As shown in FIG. 1, in the illustrated embodiment, the stamping strip reel replacing system further includes a printer 50 adapted to print a label 51 to be pasted onto the full reel 2b to be replaced. The wireless communication module 40 is further adapted to notify or instruct the autonomous mobile robot 10 to paste the printed label 51 onto the full reel 2b to be replaced on the reel driving shaft 1 after the paper strip 120 is cut off.

As shown in FIG. 1, in the illustrated embodiment, the autonomous mobile robot 10 further includes a vacuum adsorption or holding tool 16, and the autonomous mobile robot 10 is adapted to adsorb or hold the printed label 51 and paste the adsorbed label 51 onto the full reel 2b to be replaced through the vacuum adsorption tool 16 after receiving an instruction to paste a label.

As shown in FIG. 1, in the illustrated embodiment, the autonomous mobile robot 10 further includes a visual inspection device 17. The visual inspection device 17 is adapted to perform an inspection on an appearance of the full reel 2b to be replaced after the label 51 is pasted onto the full reel 2b to be replaced.

As shown in FIG. 1, in the illustrated embodiment, the autonomous mobile robot 10 is adapted to unload the full reel 2b from the reel driving shaft 1, place the unloaded full reel 2b onto the automatic guide vehicle 20, grab the empty reel 2a from the automatic guide vehicle 20, and mount the grabbed empty reel 2a onto the reel driving shaft 1 by operating the grabbing tool 14 after the visual inspection device 17 completes the inspection on the appearance.

As shown in FIG. 1, in the illustrated embodiment, the autonomous mobile robot 10 includes a vehicle-type mobile robot 11 and an arm-type industrial robot 12 carried on the vehicle-type mobile robot 11.

As shown in FIG. 1, in the illustrated embodiment, the arm-type industrial robot 12 includes a tool switching disk 13 mounted to an end arm thereof, and the grabbing tool 14, the glue applying tool 15 and the vacuum adsorption tool 16 are mounted to the tool switching disk 13, so as to achieve a quick switching among the grabbing tool 14, the glue applying tool 15 and the vacuum adsorption tool 16 though the tool switching disk 13.

As shown in FIG. 1, in the illustrated embodiment, the visual inspection device 17 is mounted to the end arm of the arm-type industrial robot 12. In this way, a position of the visual inspection device 17 relative to the tool switching disk 13 remains unchanged.

As shown in FIG. 1, in the illustrated embodiment, the stamping strip reel replacing system further includes a support platform 21 carried on the automatic guide vehicle 20, and the empty reels 2a and the full reels 2b are stacked on the support platform 21, respectively. The support platform 21 includes rollers on which the support platform 21 can be moved when the support platform 21 is removed from the automatic guide vehicle 20.

The replacement process of the stamping strip reel will be described below with reference to FIG. 1.

In a first step, the wireless communication module 40 notifies the autonomous mobile robot 10 and the automatic guide vehicle 20 to move into position to replace the reel 2 on the reel driving shaft 1 when the reel 2 on the reel driving shaft 1 is nearly fully wound. Once the reel 2 on the reel driving shaft 1 is fully wound, the shearing mechanism 30 cuts off the stamping strip 110. The glue applying tool 15 applies the glue to the paper strip 120 wound around the stamping strip 110. In this way, the paper strip 120 wound around the stamping strip 110 is bonded together to restrain and fix the stamping strip 110 wound around the full reel 2b to be replaced. After the glue has been applied to the paper strip 120 wound around the stamping strip 110 and the paper strip 120 wound around the stamping strip 110 has been bonded together, the shearing mechanism 30 cuts off the paper strip 120. Next, the printer 50 prints a label 51 to be pasted onto the full reel 2b to be replaced, and at the same time, the wireless communication module 40 notifies or instructs the autonomous mobile robot 10 to paste the printed label 51 onto the full reel 2b to be replaced on the reel driving shaft 1. In response, the autonomous mobile robot 10 adsorbs or holds the printed label 51 and pastes the adsorbed label 51 onto the full reel 2b to be replaced through the vacuum adsorption tool 16. The autonomous mobile robot 10 then performs an inspection of an appearance of the full reel 2b to be replaced through the visual inspection device 17, after which the autonomous mobile robot 10 unloads the full reel 2b from the reel driving shaft 1 and places the unloaded full reel 2b onto the automatic guide vehicle 20 by operating the grabbing tool 14. Finally, the autonomous mobile robot 10 grabs the empty reel 2a from the automatic guide vehicle 20 and mounts the grabbed empty reel 2a onto the reel driving shaft 1 by operating the grabbing tool 14.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A stamping strip reel replacing system adapted to replace a reel for winding a stamping strip, comprising:

an autonomous mobile robot for autonomously moving to a position where a reel driving shaft for mounting the reel is located, and including a grabbing tool adapted to grab the reel; and an automatic guide vehicle moving together with the autonomous mobile robot and carrying an empty reel wound with no stamping strip, the autonomous mobile robot unloading a full reel wound with the stamping strip from the reel driving shaft and placing the unloaded full reel onto the automatic guide vehicle by operating the grabbing tool, the autonomous mobile robot further grabbing the empty reel with the grabbing tool from the automatic guide vehicle and mounting the empty reel onto the reel driving shaft.

2. The stamping strip reel replacing system according to claim 1, further comprising a wireless communication module wirelessly communicating with the autonomous mobile robot and the automatic guide vehicle, the wireless communication module notifying the autonomous mobile robot and the automatic guide vehicle to replace the reel on the reel driving shaft when the reel on the reel driving shaft is approaching a fully wound state.

3. The stamping strip reel replacing system according to claim 2, further comprising a shearing mechanism for cutting off the stamping strip when the reel on the reel driving shaft is fully wound.

4. The stamping strip reel replacing system according to claim 3, wherein the autonomous mobile robot further comprises a glue applying tool for applying a glue to a paper strip wound around the stamping strip after the shearing mechanism cuts off the stamping strip, the paper strip wound around the stamping strip being bonded together by the glue to constrain and fix the stamping strip wound around the full reel to be replaced.

5. The stamping strip reel replacing system according to claim 4, wherein the shearing mechanism is further adapted to cut off the paper strip when the glue has been applied to the paper strip wound around the stamping strip and the paper strip wound around the stamping strip has been bonded together.

6. The stamping strip reel replacing system according to claim 5, further comprising a printer for printing a label to be pasted onto the full reel to be replaced, the wireless communication module is further adapted to notify the autonomous mobile robot to paste the printed label onto the full reel to be replaced on the reel driving shaft after the paper strip is cut off.

7. The stamping strip reel replacing system according to claim 6, wherein the autonomous mobile robot further comprises a vacuum holding tool, the autonomous mobile robot is further adapted to hold the printed label and paste the label onto the full reel to be replaced through the vacuum holding tool after receiving an instruction to paste a label.

8. The stamping strip reel replacing system according to claim 7, wherein the autonomous mobile robot further comprises a visual inspection device for performing an inspection of an appearance of the full reel to be replaced after the label is pasted onto the full reel to be replaced.

9. The stamping strip reel replacing system according to claim 8, wherein the autonomous mobile robot is further adapted to unload the full reel from the reel driving shaft, place the unloaded full reel onto the automatic guide vehicle, grab the empty reel from the automatic guide vehicle, and mount the grabbed empty reel onto the reel driving shaft by operating the grabbing tool after the visual inspection device completes the inspection of the appearance.

10. The stamping strip reel replacing system according to claim 8, wherein the autonomous mobile robot comprises a vehicle-type mobile robot and an arm-type industrial robot carried on the vehicle-type mobile robot.

11. The stamping strip reel replacing system according to claim 10, wherein the arm-type industrial robot includes a tool switching disk mounted to an end arm thereof, and the grabbing tool, the glue applying tool and the vacuum holding tool are mounted to the tool switching disk, so as to achieve switching among the grabbing tool, the glue applying tool and the vacuum holding tool though the tool switching disk.

12. The stamping strip reel replacing system according to claim 11, wherein the visual inspection device is mounted to the end arm of the arm-type industrial robot such that a position of the visual inspection device relative to the tool switching disk remains unchanged.

13. The stamping strip reel replacing system according to claim 1, further comprising a support platform carried on the automatic guide vehicle, the empty reels and the full reels are stacked on the support platform, respectively.

14. The stamping strip reel replacing system according to claim 13, wherein the support platform includes rollers on which the support platform can be moved when the support platform is removed from the automatic guide vehicle.

15. The reel replacing system according to claim 1, further comprising a shearing mechanism for cutting off the strip when the reel on the reel driving shaft is fully wound.

16. The reel replacing system according to claim 15, wherein the autonomous mobile robot further includes a glue applying tool for applying a glue to a paper strip wound around the strip after the shearing mechanism cuts off the strip for bonding the paper strip together.

17. The reel replacing system according to claim 16, further comprising a printer for printing a label to be pasted onto the reel to be replaced.

18. The reel replacing system according to claim 17, wherein the autonomous mobile robot further includes a labeling tool for applying the label onto the reel to be replaced.

19. The reel replacing system according to claim 18, further comprising a tool switching disk, the grabbing tool, the glue applying tool and the labeling tool are selectively mountable to the tool switching disk.

20. A reel replacing system for automatically replacing a reel for winding a strip, comprising:
an autonomous mobile robot including:
a grabbing tool; and
a visual inspection device for performing an inspection of an appearance of a reel to be replaced;
an automatic guide vehicle moving together with the autonomous mobile robot and carrying an empty reel, the autonomous mobile robot unloading the reel to replaced from a reel driving shaft and placing the unloaded full reel onto the automatic guide vehicle with the grabbing tool, the autonomous mobile robot further grabbing the empty reel from the automatic guide vehicle and mounting the empty reel onto the reel driving shaft; and
a wireless communication module for wirelessly communicating a status of the reel on the reel driving shaft with at least one of the autonomous mobile robot or the automatic guide vehicle.

* * * * *